United States Patent
Fitch et al.

(10) Patent No.: US 8,180,469 B1
(45) Date of Patent: May 15, 2012

(54) METHOD AND SYSTEM FOR LINKING TWO OR MORE PORTIONS OF DIGITAL MEDIA DATA FOR PLAYBACK

(75) Inventors: Todd M. Fitch, Santa Clara, CA (US); Mike Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1092 days.

(21) Appl. No.: 12/051,131

(22) Filed: Mar. 19, 2008

(51) Int. Cl.
 *G06F 17/00* (2006.01)
(52) U.S. Cl. .......................................... 700/94
(58) Field of Classification Search .................... 700/94; 369/1–12; 704/500–504
 See application file for complete search history.

(56) References Cited

U.S. PATENT DOCUMENTS

| | | | |
|---|---|---|---|
| 6,446,080 B1* | 9/2002 | Van Ryzin et al. | 1/1 |
| 6,721,489 B1* | 4/2004 | Benyamin et al. | 386/243 |
| 2004/0252604 A1* | 12/2004 | Johnson et al. | 369/47.22 |
| 2005/0114374 A1* | 5/2005 | Juszkiewicz et al. | 707/101 |
| 2006/0153535 A1* | 7/2006 | Chun et al. | 386/95 |
| 2006/0267995 A1* | 11/2006 | Radloff et al. | 345/530 |

* cited by examiner

*Primary Examiner* — Andrew C Flanders
(74) *Attorney, Agent, or Firm* — McKay and Hodgson, LLP; Philip McKay; Sean P. Lewis

(57) ABSTRACT

A method and system for linking portions of digital media data during playback includes a process for linking portions of digital media data during playback whereby a user is provided the capability to link two or more digital media data tracks/segments of digital media data such that the linked digital media data tracks/segments of digital media data are treated as a single entity for playback purposes, thereby ensuring that the linked digital media data tracks/segments of digital media data are played back in an order desired/dictated by the user regardless of playback mode or which of the linked tracks is selected.

27 Claims, 6 Drawing Sheets

300

```
ARTIST: LED ZEPPELIN
ALBUM: LED ZEPPELIN II    303
TITLE: HEART BREAKER

LINKS   [X]      305

TYPE  [ FORWARD ]    307

OCCURRENCE  [ ALL ]  309

TRACK TO BE LINKED   311

[LIVING LOVING MAID (SHE'S JUST A WOMAN)]
```

300

```
ARTIST: LED ZEPPELIN
ALBUM: LED ZEPPELIN II       303
TITLE: HEART BREAKER

LINKS   [X]      305

TYPE   [ FORWARD ]      307

OCCURRENCE   [  ALL  ]   309

TRACK TO BE LINKED    311
[ LIVING LOVING MAID (SHE'S JUST A WOMAN) ]
```

```
ARTIST: LED ZEPPELIN
ALBUM: LED ZEPPELIN II      403
TITLE: LIVING LOVING MAID (SHE'S JUST A WOMAN)

LINKS    [X]      405

TYPE   [ BACKWARD ]      407

OCCURRENCE  [  ALL  ]    409

TRACK TO BE LINKED       411
  [        HEART BREAKER        ]
```

```
TITLE: R-RATED MOVIE        603

LINKS    [X]     605

TYPE     [FORWARD/SKIP TO]    607

SKIP FROM    [1:12]    609

SKIP TO      [1:37]    611
```

FIG.6

METHOD AND SYSTEM FOR LINKING TWO OR MORE PORTIONS OF DIGITAL MEDIA DATA FOR PLAYBACK

BACKGROUND

Dynamic digital media encoding formats, such as Audio layer 3 (MP3), associated with digital media players, such as iPods and other audio and/or video players, are rapidly surpassing their predecessor static digital media storage and playback mechanisms, i.e., CDs and DVDs, as the digital media storage and playback devices/formats of choice.

Initially, portable digital media players were largely digital audio players, more commonly referred to as MP3 players. Typically, digital audio players are consumer electronic devices that store, organize and play, as the name implies, audio files, such as songs, soundtracks, and/or the spoken word. Soon, image-viewing and/or video-playing support was added to conventional digital audio players. As a result, many currently available digital audio players are in actuality, portable multi-media players capable of processing, storing, and playing back, audio, image, and video files in one or more formats. In addition, other types of electronic devices like cell phones now include audio and video file processing, storage, playback and/or display capabilities and are therefore also portable multi-media players. Herein, the term "digital media player" includes, but is not limited to, portable and non-portable digital audio players, portable and non-portable digital video players, portable and non-portable digital multi-media players, and/or any other device or system having one or more audio and video file processing, storage and display capabilities. A more detailed discussion of some examples of digital media players is provided below.

One very attractive feature of currently available digital media players is their ability to store, and in many cases make portable, very large amounts of data. Currently, many portable digital media players provide for 160 Giga-Bytes of data, stored, and capable of being played back on, a device that fits in the user's palm and weighs only a few ounces. By way of example, 160 Giga-Bytes of audio data equates to approximately 25,000 songs or about two months of continuous playback of audio data. In addition, many portable digital media players can be interfaced with, and share content with, larger, less portable systems, such as computing systems as defined herein, that are also digital media players.

With the advent of this much data storage and playback capability, organization of the data used and/or stored by a digital media player is a major concern. To this end, many currently available digital media players use associated digital media management systems to organize audio and/or video data in various ways to provide a user friendly and comprehensible data structure. Digital media management systems are typically software applications available on the digital media player itself and/or through a web-based function.

One example of a digital media management system is iTunes which is commonly used with Apple's iPod series of digital media players.

In many instances, digital media players and/or digital media management systems use pointers/tags to indicate the beginnings and ends of songs and/or tracks. In some instances, metadata is used in place of, or in conjunction with, pointers/tags to organize individual songs and/or tracks into albums, collections, etc. In addition, many digital media players, and/or their associated digital media management systems, allow a user to organize digital data into user defined collections such as playlists. Another popular feature of many currently available digital media players is a random playback mode whereby a user can select to have their entire collection of songs/tracks, or a designated sub-set thereof, such as a playlist, played back in a random, or semi-random, order chosen by the digital media players and/or their associated digital media management systems.

Playback of digital data, and in particular, random playback, creates numerous situations where a user may wish to ensure that two or more individual tracks of digital content are always played back together and/or are played in a specific order. For example, many music tracks are intended by the artist and/or producer to be played in a specific order. A well known example would be the Beatles' songs "Sergeant Pepper's Lonely Hearts Club Band" and "With a Little Help from My Friends" which, on the original album, and then later on the CD, were arranged by the artist/producer to be played back-to-back. Another example would be Pink Floyd's "Brain Damage" which was intended by the artist/producer to be immediately followed by "Eclipse". Prior to the advent of digital media and dynamic digital media formats such as MP3, these "related" data tracks were automatically, and typically unchangeably, fixed in a playback order by the static media format itself, i.e., by physical location on an album and/or audio tape. However, with currently available dynamic digital media formats used with digital media players, and/or their associated digital media management systems, there is currently no such fixed playback order and/or any static linkage of related tracks. Therefore, when tracks are played back in random play mode, there is no guarantee that the related tracks will be played back in the intended order, and more often than not, they are not played in the intended order. In addition, when one track of two related tracks intended to be played together is selected for playback, by any mechanism, the other track is typically not identified as being related to the selected track and therefore must itself be selected for playback, in the desired order, in a separate action.

On the other hand, in some cases, a user may wish to alter and/or customize the order of track playback, and/or edit digital track content. For instance a user may specifically wish to link two or more tracks that were never intended to be linked by the artist/producer, or edit out portions of a given track. In some cases, a user may even desire to link digital content of two tracks such that a specific portion/segment of a first track is linked to a specific portion/segment of another track. Currently available digital media players, portable digital media players, and their associated digital media management systems, lack this ability to link tracks, and/or segments of tracks for playback purposes, at least in any intuitive and user friendly way. Consequently, many users of digital media players are denied the capability to optimize and/or control their digital media experience.

SUMMARY

In accordance with one embodiment, a method and system for linking portions of digital media data during playback includes a process for linking portions of digital media data during playback whereby, in one embodiment, a user is provided the capability to link two or more digital media data tracks/segments of digital media data such that the linked digital media data tracks/segments of digital media data are treated as a single entity for playback purposes, thereby ensuring that the linked digital media data tracks/segments of digital media data are played back in an order desired/dictated by the user, regardless of the playback mode selected and regardless of which of the linked digital media data tracks/segments of digital media data is selected for playback.

In one embodiment, the two or more digital media data tracks/segments of digital media data desired to be played back in specific sequence are linked using linking pointers that point both forward from a first digital media data track/segment of digital media data that the user desires to be played back first and backward from a second digital media data track/segment of digital media data that the user desires to be played back second. Consequently, in one embodiment, when either the first or second digital media data track/segment of digital media data is selected for playback by one or more digital media management systems and/or digital media players, either a forward or backward linking pointer points to the linked digital media data track/segment of digital media data and indicates that the linked digital media data track/segment of digital media data must be included with the selected digital media data track/segment of digital media data and played in the desired order with respect to the selected digital media data track/segment of digital media data.

In one embodiment, the linking pointers discussed above are created in response to user action via a user interface on a computing system based digital media player and/or a portable digital media player that allows the user to link two or more digital media data tracks/segments of digital media data via any one or more well known user interface devices/actions such as "drag and drop", and or editable lists of digital media data tracks/segments of digital media data, and/or user data entry fields. In one embodiment, as a default, i.e., absent user input, a given digital media data track includes no linking pointers, or blank linking pointers, thereby indicating no specified links to other digital media data tracks and no specified playback order. In one embodiment, the forward and/or backward linking pointers are included and/or added to a tag set associated with the respective digital media data tracks. In one embodiment, the forward and/or backward pointers are stored with the associated digital media data tracks on a digital media player, and/or a system linked to the digital media player, such as a desktop computing system and/or a CD database. In one embodiment, the forward and/or backward pointers are stored separately from the associated digital media data tracks. In one embodiment, the forward and/or backward pointers linking the associated digital media data tracks/segments of digital media data is transferred along with the associated digital media data whenever the associated digital media data transferred between computing systems and/or digital media players.

In one embodiment, the two or more digital media data tracks/segments of digital media data are linked using a metadata structure and/or a metadata structure imposed upon existing metadata. Typically, metadata is used to define the beginning and ending points of a digital media data track and is used to define a "piece", i.e., a digital entity, for playback purposes, including random playback. In addition, metadata is often currently used to define playback characteristics such as artist name, album name, equalizer settings for a given digital media data track, file format, etc.

In one embodiment, using the method and system for linking portions of digital media data during playback disclosed herein, an additional layer of metadata is made available to the user via a user interface on a computing system and/or a digital media player. In one embodiment, the additional layer of metadata provided allows the user to link two or more digital media data tracks/segments of digital media data using data entry fields in the user interface that indicate, in one embodiment, not only the linking of the two or more digital media data tracks of digital media data, but the exact segments of the two or more digital media data tracks to be linked, thereby providing editing capability typically associated with a producer of the digital media data to any user.

In addition, in one embodiment, two or more segments of digital media data already structured via metadata can be linked into trans-segment portions of digital media data using a metadata layer imposed over the existing metadata structure. For instance, in one embodiment, digital media data tracks/segments of digital media data already linked by metadata into in single "album" can be further linked to other digital media data tracks/segments of digital media data in trans-segment portions of digital media data using a second layer of metadata. As an example, using one embodiment, portions of two albums including multiple digital media data tracks can be linked for playback purposes. As another example, using one embodiment, segments of two or more video files and/or video works can be linked for playback purposes.

In one embodiment, the layer of metadata linking the associated digital media data tracks/segments of digital media data is stored on a digital media player and/or a system linked to the digital media player. In one embodiment, the layer of metadata linking the associated digital media data tracks/segments of digital media data is stored separately from the associated digital media data tracks. In one embodiment, the layer of metadata linking the associated digital media data tracks/segments of digital media data is transferred along with the associated digital media data whenever the associated digital media data transferred between computing systems and/or digital media players.

Using the method and system for linking portions of digital media data during playback disclosed herein, a user is provided the capability to customize digital media data in an efficient and relatively simple way. As a result, a user of the method and system for linking portions of digital media data during playback disclosed herein is provided significant control over both the experience provided by the digital media data and the content of the digital media data. This capability can be used to not only increase the enjoyment of the digital media, and the digital media player, by providing the user capabilities previously available only to producers/providers of the digital media data, but also provides users with content control. Consequently, the method and system for linking portions of digital media data during playback disclosed herein provides the user with a powerful tool for managing the seemly endless, and at times overwhelming, amount of digital media data available.

BRIEF DESCRIPTION OF THE DRAWINGS

FIG. 3 is a representation of one example of a user interface for creating a forward link between two digital media data tracks in accordance with one embodiment;

FIG. 4 is a representation of one example of a user interface for creating a backward link between two digital media data tracks in accordance with one embodiment;

FIG. 6 is a representation of one example of a user interface for creating a forward/skip to link between two segments of digital media data in accordance with one embodiment.

Figure 1:
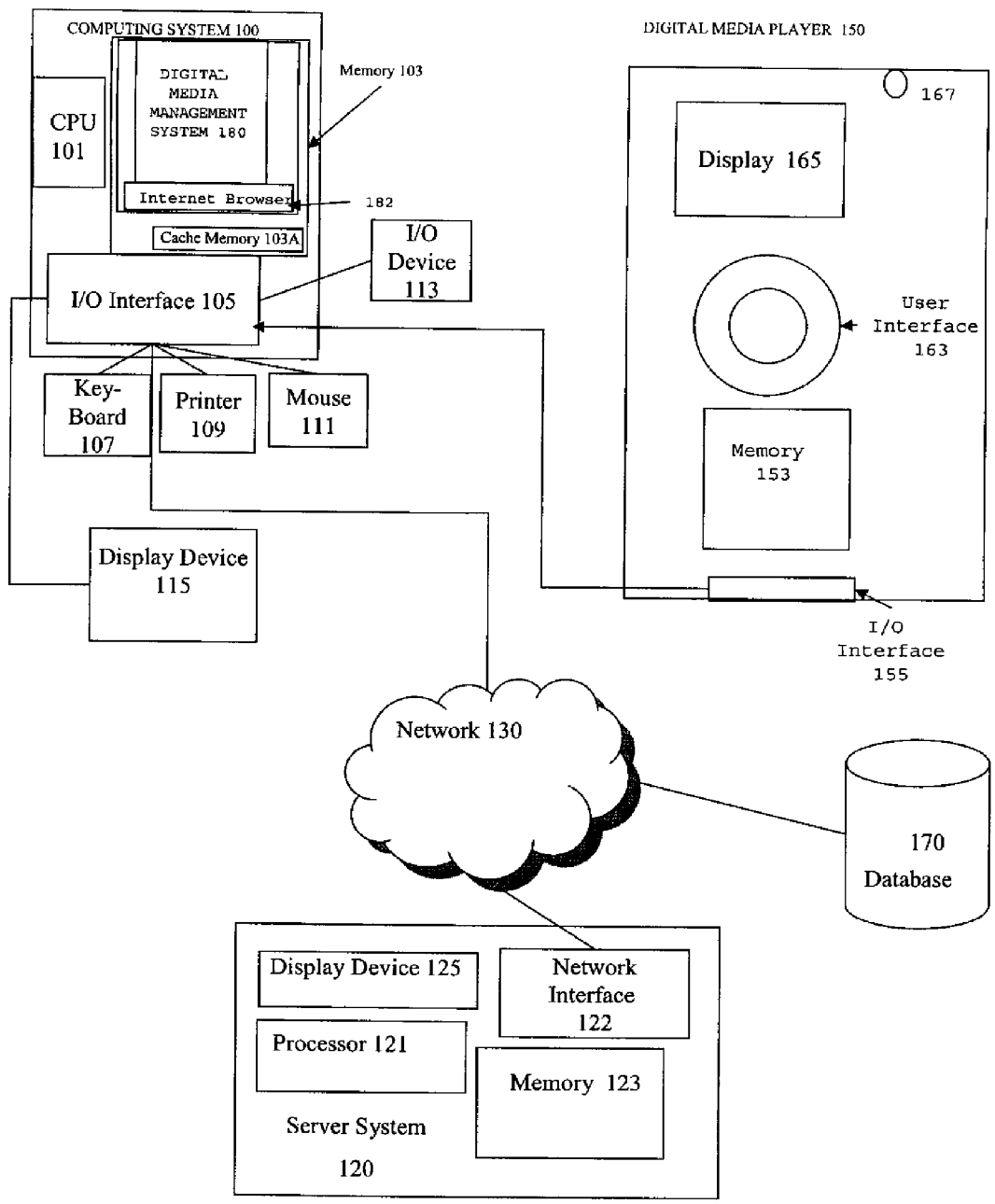
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for linking portions of digital media data during playback includes a process for linking portions of digital media data during playback whereby, in one embodiment, a user is provided the capability to link two or more digital media data tracks/segments of digital media data such that the linked digital media data tracks/segments of digital media data are treated as a single entity for playback purposes, thereby ensuring that the linked digital media data tracks/segments of digital media data are played back in an order dictated by the user.

In one embodiment, the two or more digital media data tracks/segments of digital media data are linked using linking pointers that point both forward from a first digital media data track/segment of digital media data that the user desires to be played back first and backward from a second digital media data track/segment of digital media data that the user desires to be played back second. Consequently, in one embodiment, when either the first or second digital media data track/segment of digital media data is selected for playback, either a forward or backward linking pointer points to the linked digital media data track/segment of digital media data and indicates that the linked digital media data track/segment of digital media data must be included with the selected digital media data track/segment of digital media data and played in the desired order with respect to the selected digital media data track/segment of digital media data.

In one embodiment, the two or more digital media data tracks/segments of digital media data are linked using a metadata structure and/or a metadata structure imposed upon existing metadata. In one embodiment, the additional layer of metadata is provided to the user via a user interface on a computing system and/or a digital media player. In one embodiment, the additional layer of metadata provided allows the user to link two or more digital media data tracks/segments of digital media data using data entry fields in the user interface that indicate, in one embodiment, not only the linking of the two or more digital media data tracks/segments of digital media data, but the exact portion of the two or more digital media data tracks/segments of digital media data to be linked.

Hardware System Architecture

FIG. 1 is a block diagram of an exemplary hardware architecture for implementing one embodiment of a system and method for linking portions of digital media data during playback, such as exemplary processes 200 (FIG. 2) and 500 (FIG. 5) discussed herein, that, returning to FIG. 1, includes: a computing system 100, e.g., a first computing system; an exemplary digital media player 150; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, computing system 100 is itself a digital media player capable of standalone operation, and/or operation with another digital media player, such as digital media player 150. In one embodiment, memory system 103 includes all, or part, of a digital media management system 180, such as any digital media management system 180 defined herein, known in the art at the time of filing, and/or as developed thereafter. One example of a digital media management system 180 is iTunes. In one embodiment, digital media management system 180 is stored, in whole, or in part, in memory system 103, and is used by, or includes, or is accessed by, a process for linking portions of digital media data during playback, such as exemplary process 200 (FIG. 2) and exemplary process 500 (FIG. 5) discussed below, and/or digital media player 150.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, USB port, or other digital or waveform port, or other device capable of inputting data to, and outputting data from, computing system 100, whether available or known at the time of filing or as later developed. As discussed in more detail below, in one embodiment, all or part of a process for linking portions of digital media data during playback and/or a digital media management system 180 are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by one or more consumers and/or digital media providers and is used, and/or accessible, by another computing system and/or a digital media player, such as digital media player 150 (discussed below). Computing system 100 can be any computing system as defined herein, and/or as known in the art at the time of filing, and/or as developed thereafter, that includes components that can execute all, or part, of a process for linking portions of digital media data during playback, and/or a digital media management system 180, in accordance with at least one of the embodiments as described herein.

In one embodiment, computing system 100 is used, controlled, and/or accessible by a user of one or more digital media players, such as digital media player 150, and digital media data associated with one or more users, is stored in computing system 100, typically in accounts associated with a given user and/or digital media player. In one embodiment, computing system 100 is used, controlled, and/or accessible by, a provider of and/or a system and process for linking portions of digital media data during playback and digital media data associated with one or more users and/or data associated with the digital media data is stored in computing system 100. In one embodiment, computing system 100 is used, controlled, and/or accessible by, a provider of a digital media management system 180 and digital media data associated with one or more users and/or data associated with the digital media data is stored in computing system 100.

Digital media player 150 is any one of numerous digital media players as defined herein, as known in the art at the time of filing, or as developed after the time of filing. As discussed above, herein, the term "digital media player" includes, but is not limited to, portable and non-portable digital audio players, portable and non-portable digital video players, portable and non-portable digital multi-media players, and/or any other device or system having one or more audio and video file processing, storage and display capabilities.

As noted above, digital media players, such as digital media player 150 are often portable and typically are an electronic device that is capable of storing and playing digital media. In one embodiment, all, or part, of the digital media data associated with a user and/or a user account is stored on a memory 153. In various embodiments, memory 153 is a hard drive, micro-drive, or flash memory. In some embodiments, digital media player 150 also includes other capabilities (not shown) such as cell phone and/or PDA functions.

In one embodiment, digital media player 150 is capable of playing digital audio, displaying images, and/or playing video. In one embodiment, digital media player 150 includes display 165. In one embodiment, display 165 is a LCD or OLED screen. In one embodiment, display 165 is a color screen. In various embodiments, display 165 ranges in size from 1 to 20 or more inches. In various embodiments, resolutions of display 165 also vary, going up, in some embodiments, to WVGA. In one embodiment, display 165 comes with a color depth of 16-bit or higher including the 24 bit Truecolor of Windows systems, with the ability to display 16.7 million distinct colors. In one embodiment, display 165 has a matte finish but it may also come in glossy finish to increase color intensity and contrast. In addition, in some embodiments, display 165 is a touch screen and provides a form of primary, or alternate, user input.

In one embodiment, digital media player 150 includes the ability to record video, with, or without, the aid of optional accessories or cables (not shown), and audio, with, in one embodiment, a built-in microphone (not shown) or from a line-out cable or FM tuner (not shown). In one embodiment, digital media player 150 includes readers for memory cards (not shown), which equip digital media player 150 with extra storage for transferring digital media data. In some embodiments, digital media player 150 includes features of a personal organizer and/or support for games.

In one embodiment, digital media player 150 is compatible with the MP3 audio format or any other dynamic digital media format capable of being edited by the user. In some embodiments, digital media player 150 supports the Windows Media Audio (WMA) format, Advanced Audio Coding (AAC) and/or WAV. In one embodiment, digital media player 150 is compatible with open-source formats like Ogg Vorbis and FLAC. In some embodiments, digital media player 150 supports audio with DRM protection. In one embodiment, digital media player 150 includes a bit rate limit on each audio file format supported.

In one embodiment, image files are viewed on digital media player 150 in the JPEG format. In some embodiments, digital media player 150 provides compatibility to additional file formats like GIF, PNG, and TIFF.

The iPod and the PlayStation Portable are popular examples of a portable digital media player, such as digital media player 150, that support the MPEG-4 video format, and some digital media players, such as digital media player 150, are compatible with the Windows Media Video (WMV) format and the now-defunct AVI. Recently, more and more digital media players, such as digital media player 150, are enabling compatibility to the DivX video format and its open-source parallel, Xvid.

In one embodiment, digital media player 150 is packaged/sold with an installation CD/DVD (not shown) that inserts device drivers and/or software that are capable of seamlessly transferring files between digital media player 150 and a computing system, such as computing system 100. In one embodiment, the device drivers and/or software are available online via the manufacturers' websites, or natively recognized by the operating system of digital media player 150 and a computing system, such as computing system 100, through Universal Mass Storage (UMS) or Media Transfer Protocol (MTP).

In one embodiment, digital media player 150 includes a user interface 163. In one embodiment, user interface 163 is a 5-way D-pad used to navigate. In one embodiment, user interface 163 is wheel and touch mechanisms such as those seen the Apple iPod, SanDisk Sansa e200, and Creative ZEN Vision: M. In one embodiment, digital media player 150 includes additional buttons/mechanisms (not shown) for features such as volume control and setting locks.

In one embodiment, digital media player 150 is powered by a rechargeable battery (not shown). In one embodiment, digital media player 150 includes an audio jack 167, such as a 3.5 mm jack used for head phones and/or other audio output.

In one embodiment, digital media player 150 can play music that has been "ripped", i.e., copied/transferred, from Compact Discs via a computing system, such as computing system 100 and I/O device 113. In addition to ripped CD tracks, in one embodiment, digital media player 150 can accept downloaded music from online music stores such as the iTunes store sponsored by Apple. However, such stores often use proprietary formats and DRM, which means that the tracks can only be played on suitably licensed and restricted devices. For example, at the time of filing, purchased songs from iTunes might not work on any digital media player other than an Apple iPod. In one embodiment, digital media player 150 can play music that has been ripped from radio broadcasts played on a built-in FM tuner (not shown).

Currently, MP3 is the dominant audio format, and is nearly universally supported by digital media players, such as digital media player 150. The main alternative formats are: AAC, typically supported on digital media players, such as digital media player 150, from Apple; ATRAC, typically supported on digital media players, such as digital media player 150, from Sony; and WMA, typically supported on digital media players, such as digital media player 150, from Microsoft and partners. Unlike MP3, these formats support DRM restrictions, which are often added to files from paid download services. In some cases, open source formats which are more or less patent-free are available but less widely supported—examples include Ogg Vorbis, FLAG, Speex, and Module file formats.

In one embodiment, digital media player 150 includes I/O interface 155 that is coupled to computing system 100 via I/O interface 105, typically with a connection cable such as a USB cable, for transferring files between digital media player 150 and a computing system, such as computing system 100.

As discussed in more detail below, in one embodiment, all, or part, of a process for linking portions of digital media data during playback, and/or a digital media management system, can also be loaded, in whole, or in part, into digital media player 150 from computing system 100 for storage in memory system 153.

Also shown in FIG. 1 is database 170. In one embodiment, database 170 is a data storage device, a designated server system or computing system, or a designated portion of one or more server systems or computing systems, such as computing system 100, digital media player 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function.

In one embodiment, database 170 is a database used, controlled, and/or accessible by, a user of one or more digital media players, such as digital media player 150, and digital media data associated with one or more users and/or digital media players, is stored in database 170, typically in accounts associated with a given user and/or digital media player. In one embodiment, database 170 is a CD database used, controlled, and/or accessible by, a provider of and/or a system and process for linking portions of digital media data during playback and digital media data associated with one or more tracks of digital media data is stored in database 170. In one embodiment, database 170 is a CD database used, controlled, and/or accessible by, a provider of a digital media management system 180 and digital media data associated with one or more digital media data tracks is stored in database 170.

In one embodiment, computing system 100 and digital media player 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, and/or one or more digital media players, such as digital media player 150. In one embodiment, server system 120 is a database used, controlled, and/or accessible by, a user of one or more digital media players, such as digital media player 150, and digital media data associated with one or more users is stored in server system 120, typically in accounts associated with a given user and/or digital media player. In one embodiment, server system 120 acts as a CD database used, controlled, and/or accessible by, a provider of and/or a system and process for linking portions of digital media data during playback and digital media data associated with one or more tracks of digital media data is stored in server system 120. In one embodiment, server system 120 is used as a CD database used, controlled, and/or accessible by, a provider of a digital media management system 180 and digital media data associated with one or more digital media data tracks is stored in server system 120.

Network 130 can be any network or network system as defined herein, known in the art at the time of filing, and/or as developed after the time of filing, capable of allowing communication between two or more computing systems and/or one or more digital media players, such as digital media player 150.

Those of skill in the art will readily recognize that the components shown in FIG. 1, such as computing system 100, digital media player 150, database 170, server system 120, and their respective components, are shown for illustrative purposes only and that architectures with more or fewer components can implement, and benefit from, the invention. Moreover, one or more components of computing system 100, digital media player 150, database 170, and server system 120 may be located remotely from their respective system and accessed via network 130. In addition, the particular type of, and configuration of, computing system 100, digital media player 150, database 170, and server system 120 are not relevant.

As discussed in more detail below, in one embodiment, a process for linking portions of digital media data during playback, and/or a digital media management system, and/or digital media data associated with one or more users and/or one or more digital media data tracks are stored, in whole, or in part, in memory system 103 and/or cache memory 103A, of computing system 100, and/or memory system 153 of digital media player 150, and/or in server memory system 123 of server system 120 and/or in database 170, and executed on computing system 100 and/or digital media player 150. As used herein, a memory refers to a volatile memory, a non-volatile memory, or any combination of the two.

Although a process for linking portions of digital media data during playback, and/or a digital media management system 180, are sometimes referred to herein, alternatively, as a process, an application, a module, a program, a component of a software system, a component of a software package, a component of a parent system, a plug-in, or a feature of a parent system, this terminology is illustrative only. In some embodiments, a process for linking portions of digital media data during playback, and/or a digital media management system, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, or server system processor 121.

In one embodiment, a process for linking portions of digital media data during playback, and/or a digital media management system, and/or digital media data associated with one or more users and/or one or more digital media data tracks are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and/or digital media player, such as digital media player 150, described above. However, in some embodiments, the medium also may be removable and/or remote from the computing system and/or digital media player.

Process

Herein, the terms "user", "individual", and/or "consumer" are used interchangeably to denote any party using, interfacing with, and/or interacting with a process for linking portions of digital media data during playback and/or a party who controls and/or owns digital media data that is processed by and/or the subject of, a process for linking portions of digital media data during playback, and/or an authorized agent of any party using, interfacing with, and/or interacting with a process for linking portions of digital media data during playback and/or an authorized agent of a party who controls and/or owns digital media data that is processed by and/or the subject of, a process for linking portions of digital media data during playback. As an example, as used herein, the term "user" can include, but is not limited to: a consumer of digital media data; an owner of digital media data; a producer of digital media data; a distributor of digital media data; a composer/creator of digital media data; an artist; a musician; an actor; a director; or any other party using, interfacing with, and/or interacting with a process for linking portions of digital media data during playback.

Herein, the term "digital media data" includes audio data, video data, and/or image data, and any combination of audio data, video data, and/or image data.

Herein, the term "digital media track" includes a distinct portion of audio data, video data, and/or image data. One example of a digital media track would be a song.

Herein, the term "segment of digital media data" includes a portion of audio data, video data, and/or image data. Herein a segment of digital media data can be a digital media track or any portion/fraction of a digital media data track. Herein a segment of digital media data can include multiple digital media tracks or any portion/fraction of multiple digital media data tracks.

Herein, the term "trans-segment portion of digital media data" denotes a portion of digital media data that can include all or part of two or more digital media tracks and/or segments of digital media data.

Herein, the term "digital media player" includes, but is not limited to, digital audio players, digital video players, digital multi-media players, and/or any other device, system, and/or computing system (as defined herein) having one or more audio and video file processing, storage and display/playback capabilities.

Herein, the term "portable digital media player" includes, but is not limited to, portable digital audio players, portable digital video players, portable digital multi-media players, and/or any other portable device, system, and/or computing system (as defined herein) having one or more audio and video file processing, storage and display/playback capabilities.

As used herein, the term "digital media management system" includes any system used to organize digital media data for either processing or display. Digital media management systems are typically software applications available on the associated digital media player itself and/or through a web-based function. One example of a digital media management system is iTunes which is commonly used with Apple's iPod series of digital media players.

As used herein, the term computing system, denotes, but is not limited to: a portable computer; a workstation; a two-way pager; a cellular telephone; a smart phone; a digital wireless telephone; a Personal Digital Assistant (PDA); a digital media player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; digital media players; server computers; or any desired combination of these devices, that are coupled to perform the processes and/or operations as described herein.

As used herein, the term "network" is used to denote any network or network system such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer a general database or a specialized database, such as a CD or DVD database. Herein, the term "database" can refer to a web-based function. Herein, the term "database" can refer to a data storage means that is part of, or under the control of, any computing system and/or digital media player as defined herein, known at the time of filing, or as developed thereafter.

In accordance with one embodiment, a method and system for linking portions of digital media data during playback includes a process for linking portions of digital media data during playback whereby, in one embodiment, a user is provided the capability to link two or more digital media data tracks/segments of digital media data such that the linked digital media data tracks/segments of digital media data are treated as a single entity for playback purposes, thereby ensuring that the linked digital media data tracks/segments of digital media data are played back in an order dictated by the user.

Figure 2:
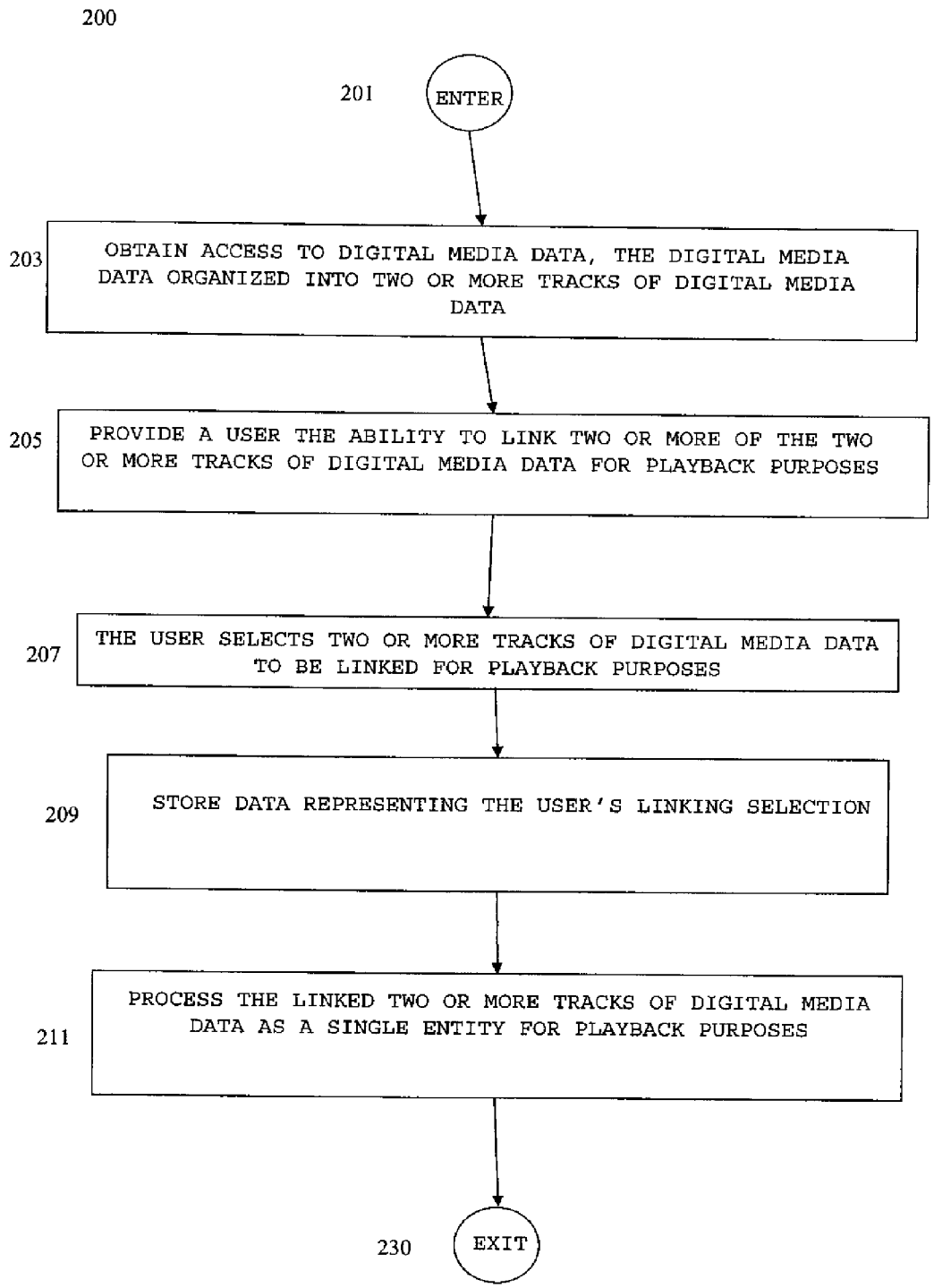
FIG. 2 is a flow chart depicting a process for linking portions of digital media data during playback in accordance with one embodiment.

FIG. 2 a flow chart depicting a process for linking portions of digital media data during playback 200 in accordance with one embodiment. Process for linking portions of digital media data during playback 200 begins at ENTER OPERATION 201 of FIG. 2 and process flow proceeds to OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203.

In one embodiment, at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 process for linking portions of digital media data during playback 200 is provided access to two or more digital media data tracks/segments of digital media data.

As discussed above, the digital media data accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 can be any digital media data, such as audio and/or video data, in a digital media encoding format that is divided into two or more distinct segments or tracks. Herein, the distinct segments or tracks are also referred to as: segments of digital media data; digital media data tracks/segments of digital media data; or digital media data tracks. For example, the digital media data accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 can be, but is not limited to, any one or more of the following: audio data, such as data representing songs, sound tracks, spoken word, audio books, audio recorded by the user, or any other audio source; video data, such as data representing movies, television shows, music videos, web downloads, etc.; or any other digital media data in a digital media encoding format that is divided into two or more distinct segments or tracks as discussed herein, known at the time of filing, or as developed thereafter.

Depending on the nature of the digital media data and the digital media player used to store and/or playback the digital media data, the digital media data accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 can be stored in any one of numerous locations and/or by any one of numerous methods. As an example, the digital media data accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 can reside in: a memory of a computing system, such as memory system 103 of computing system 100 of FIG. 1; a memory of a digital media player, such as memory 153 of digital media player 150 of FIG. 1; in a database, such as database 170 of FIG. 1; in a memory of a server system, such as memory 123 of server system 120 of FIG. 1; in a web-based system; or in/by any other means, mechanism, or process for storing digital media data.

Returning to FIG. 2, in one embodiment, the digital media data is accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 either directly, or through a digital media management system, such as digital media management system 180 of FIG. 1, that implements, includes, is accessible by, and/or is otherwise associated with, process for linking portions of digital media data during playback 200 (FIG. 2). As noted above, digital media management systems include any system used to organize digital media data for either processing or playback/display. As also noted above, digital media management systems are typically software applications available on the associated digital media player itself and/or through a web-based function, often sponsored by the provider of the digital media player and/or the digital media data. One example of a digital media management system is iTunes which is commonly used with Apple's iPod series of digital media players.

In one embodiment, the digital media data is accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 by providing process for linking portions of digital media data during playback 200, and/or a digital media management system associated with process for linking portions of digital media data during playback 200, access to the data on: a database, such as database 170 of FIG. 1; a computing system, such as computing system 100 and/or digital media player 150 of FIG. 1; a server system, such as server system 120 of FIG. 1; a web-site or other web-based system; and/or using a computer program product as defined herein.

Returning to FIG. 2, in one embodiment, the digital media data is accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 by process for linking portions of digital media data during playback 200, and/or a digital media management system associated with process for linking portions of digital media data during playback 200, through a network, such as network 130 of FIG. 1, of computing systems and/or server systems that is comprised of multiple different computers, digital media players, wireless devices, cellular telephones, digital telephones, two-way pagers, personal digital assistants, server computers, or any desired combination of these devices.

Returning to FIG. 2, in one embodiment, the digital media data is accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 using any method, apparatus, process or mechanism for transferring/accessing digital media data from one or more devices, computing systems, digital media players, server systems, databases, web site/web functions and/or any devices having a data storage capability to one or more other devices, computing systems, digital media players, server systems, databases, web site/web functions and/or any devices, whether known at the time of filing or as thereafter developed.

As a specific example provided for illustrative purposes only, we will stipulate that, in this one specific example, process for linking portions of digital media data during playback 200 is associated with a digital media management system running on a digital media player that plays audio files. Consequently, we will stipulate for this specific example that the digital media data is primarily data representing songs organized in digital media data tracks for each song. This example will be used throughout the discussion below for illustrative purposes only. However, the reader is reminded that the digital media data accessed at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 can be any form of digital media data, as discussed herein, known in the art, or as developed after the time of filing.

In one embodiment, once process for linking portions of digital media data during playback 200 is provided access to two or more tracks of digital media data at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203, process flow proceeds to PROVIDE A USER THE ABILITY TO LINK TWO OR MORE OF THE TWO OR MORE TRACKS OF DIGITAL MEDIA DATA FOR PLAYBACK PURPOSES OPERATION 205.

In one embodiment, at PROVIDE A USER THE ABILITY TO LINK TWO OR MORE OF THE TWO OR MORE TRACKS OF DIGITAL MEDIA DATA FOR PLAYBACK PURPOSES OPERATION 205, a user is provided the capability to view and then link two or more digital media data tracks/segments of digital media data.

As discussed in more detail below, in one embodiment, at PROVIDE A USER THE ABILITY TO LINK TWO OR MORE OF THE TWO OR MORE TRACKS OF DIGITAL MEDIA DATA FOR PLAYBACK PURPOSES OPERATION 205, a user is provided the capability to link two or more digital media data tracks/segments of digital media data such that the linked digital media data tracks/segments of digital media data are treated as a single entity for playback purposes, thereby ensuring that the linked digital media data tracks/segments of digital media data are played back in an order desired/dictated by the user, regardless of the playback mode selected or which digital media data track is selected.

In one embodiment, at PROVIDE A USER THE ABILITY TO LINK TWO OR MORE OF THE TWO OR MORE TRACKS OF DIGITAL MEDIA DATA FOR PLAYBACK PURPOSES OPERATION 205, a user is provided the capability to link two or more digital media data tracks/segments of digital media data via a user interface on a computing system based digital media player, such as display device 115 of computing system 100 in FIG. 1, and/or a display of a digital media player, such as display 165 of digital media player 150 in FIG. 1. Returning to FIG. 2, in one embodiment, the user interface allows the user to link two or more digital media data tracks/segments of digital media data via any one or more well known user interface devices/actions such as "drag and drop", and/or editable lists of digital media data tracks/segments of digital media data, and/or user data entry fields.

FIG. 3 is a representation of one example of a user interface 300 for creating a "forward link" between two digital media data tracks in accordance with one embodiment. FIG. 4 is a representation of one example of a related user interface 400 for creating a "backward link" between two digital media data tracks in accordance with one embodiment. In the specific examples shown in FIG. 3 and FIG. 4, the digital media data is shown as audio data and the two digital media data tracks/segments of digital media data are audio tracks representing individual songs that are to be linked. However, the reader is again reminded that that the digital media data can be any form of digital media data, as discussed herein, known in the art, or as developed after the time of filing.

As seen in FIGS. 3 and 4, user interfaces 300 and 400 include digital media data identification section 303 and 403, respectively. Typically, the information shown in digital media data identification sections 303 and 403 is metadata provided by any one or more of: the digital media player, such as digital media player 105 or computing system 100 of FIG. 1; a digital media management system, such as digital media management system 180 of FIG. 1; the provider of the digital media data and/or the digital media player; a database, such as database 170 of FIG. 1; or any other source of digital media data identification discussed herein, known at the time of filing, or as developed thereafter.

Returning to FIGS. 3 and 4, user interfaces 300 and 400 also include "Links" checkboxes 305 and 405, respectively. In one embodiment, the user is provided the opportunity to check/activate Links checkbox 305 and/or 405 using a user interface device. In one embodiment, by checking/activating either one of Links checkboxes 305 and 405, the user activates the track linking feature of process for linking portions of digital media data during playback 200 (FIG. 2).

Returning to FIG. 3, in one embodiment, once a user checks/activates Links checkbox 305, Type Field 307, Occurrence Field 309, and Track to be Linked Field 311 become active. Similarly, in one embodiment, once a user checks/activates links checkbox 405 of FIG. 4, Type Field 407, Occurrence Field 409, and Track to be Linked Field 411 become active.

Turning now to FIG. 3, in one embodiment, Type Field 307 allows a user to designate the desired link being created as either a "forward link" or a "backward link", thereby indicating a desired order of relative playback for the two tracks identified by digital media data identification section 303 and Track to be Linked Field 311. Note that in this example, Track to be Linked Field 311 designates the same digital media data track as is designated in digital media data identification section 403 of FIG. 4. In one embodiment, choosing a forward link indicates the track identified in digital media data identification section 303 is to be played first, before the track identified in Track to be Linked Field 311, i.e., the digital media data track of digital media data identification section 403. Likewise, in one embodiment, choosing a backward link indicates the track identified in digital media data identification section 303 is to be played second, after the track identified in Track to be Linked Field 311.

Similarly, turning now to FIG. 4, in one embodiment, Type Field 407 allows a user to designate a desired link as a forward link or a backward link, thereby indicating a desired order of relative playback for the two tracks identified by digital media data identification section 403 and Track to be Linked Field 411. Also note that, in this particular example, the digital media data track designated by Track to be Linked Field 411 of FIG. 4 is the same digital media data track identified by digital media data identification section 303 of FIG. 3.

In one embodiment, using Type Field 307 to designate a desired link as a forward link between the two tracks identified by digital media data identification section 303 and Track to be Linked Field 311 causes Type Field 407 of FIG. 4 to automatically be designated as a backward link. This is done to ensure that if either of the linked digital media data tracks identified by digital media data identification section 303 of FIG. 3 and digital media data identification section 403 of FIG. 4 are selected for playback, the linking of the two digital media data tracks is attached.

Returning to FIGS. 3 and 4, user interfaces 300 and 400 also include Occurrence Fields 309 and 409, respectively. In one embodiment, using Occurrence Fields 309 and 409, a user can designate when the link being created is to be applied. For instance, in one embodiment, a user may choose between linking the two digital media data tracks in all playback occurrences, or, in the alternative, only when the playback mode is set to random mode. As another example, the linking may be restricted by Occurrence Fields 309 and 409 to playback within designated playlists that include one or more of the linked digital media data tracks.

Those of skill in the art will readily recognize that the choice of information displayed, the organization of the information displayed, and the manner in which the information is displayed in FIG. 3 and FIG. 4 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 and FIG. 4 are possible, and that the specific means discussed above do not limit the invention as set forth in the claims below.

Returning to FIG. 2, in one embodiment, at PROVIDE A USER THE ABILITY TO LINK TWO OR MORE OF THE TWO OR MORE TRACKS OF DIGITAL MEDIA DATA FOR PLAYBACK PURPOSES OPERATION 205, in response to user interaction with a user interface, such as user interfaces 300 and 400 (FIGS. 3 and 4), two or more digital media data tracks/segments of digital media data desired to be played back in specific sequence are linked using linking pointers (not shown) that point both forward from a first digital media data track/segment of digital data that the user desires to be played back first and backward from a second digital media data track/segment of digital data that the user desires to be played back second. Consequently, in one embodiment, when either the first or second digital media data track/segment of digital data is selected for playback by one or more digital media management systems, such as digital media management system 180 of FIG. 1, and/or digital media players, such as digital media player 150 of FIG. 1, either a forward or backward linking pointer points to the linked digital media data track/segment of digital data and indicates that the linked digital media data track/segment of digital data must be included with the selected digital media data track/segment of digital data, and played in the desired order with respect to the selected digital media data track/segment of digital data.

As noted above, in one embodiment, the linking pointers discussed above are created in response to user action via a user interface, such as user interfaces 300 and 400 (FIGS. 3 and 4), on a computing system based digital media player and/or a portable digital media player. As also discussed above, in one embodiment, the user interface allows the user to link two or more digital media data tracks/segments of digital media data via any one or more well known user interface devices/actions such as "drag and drop", and/or editable lists of digital media data tracks/segments of digital media data, and/or user data entry fields. In one embodiment, as a default, i.e., absent user input, a given digital media data track includes no linking pointers, or blank linking pointers, thereby indicating no specified links to other digital media data tracks and no specified playback order. In one embodiment, the forward and/or backward linking pointers are included and/or added to a tag set (not shown) associated with the respective digital media data tracks. In one embodiment, the forward and/or backward pointers are stored with the associated digital media data tracks on a digital media player, such as digital media player 150 of FIG. 1, and/or a system linked to the digital media player, such as a desktop computing system and/or a database. In one embodiment, the forward and/or backward pointers are stored separately from the associated digital media data tracks. In one embodiment, the forward and/or backward pointers linking the associated digital media data tracks/segments of digital media data is transferred along with the associated digital media data whenever the associated digital media data transferred between computing systems and/or digital media players.

Methods, means, mechanisms, procedures and/or processes for creating pointers, such as linking pointers, are well known to those of skill in the art. Consequently, a more detailed discussion of methods, means, mechanisms, procedures and/or processes for creating pointers, such as linking pointers, is omitted here to avoid detracting from the invention.

Returning to FIG. 2, in one embodiment, at PROVIDE A USER THE ABILITY TO LINK TWO OR MORE OF THE TWO OR MORE TRACKS OF DIGITAL MEDIA DATA FOR PLAYBACK PURPOSES OPERATION 205, in response to user interaction with a user interface screen, such as user interfaces 300 and 400 (FIGS. 3 and 4), two or more digital media data tracks/segments of digital media data desired to be played back in specific sequence are linked using a metadata structure and/or a metadata structure imposed upon existing metadata.

Returning to FIG. 2, in one embodiment, at PROVIDE A USER THE ABILITY TO LINK TWO OR MORE OF THE TWO OR MORE TRACKS OF DIGITAL MEDIA DATA FOR PLAYBACK PURPOSES OPERATION 205, an additional layer of metadata is made available to the user via a user interface, such as user interfaces 300 and 400 (FIGS. 3 and 4), on a computing system and/or a digital media player, such as computing system 100 of FIG. 1 and/or digital media player 150 of FIG. 1. In one embodiment, the additional layer of metadata provided allows the user to link two or more digital media data tracks/segments of digital media data using data entry fields in the user interface in a manner similar to that discussed above with respect to FIGS. 3 and 4.

In one embodiment, the layer of metadata linking the associated digital media data tracks/segments of digital media data is stored on a digital media player and/or a system linked to the digital media player. In one embodiment, the layer of metadata linking the associated digital media data tracks/segments of digital media data is stored separately from the associated digital media data tracks.

Methods, means, mechanisms, procedures and/or processes for creating and/or implementing metadata and metadata structures are well known to those of skill in the art. Consequently, a more detailed discussion of methods, means, mechanisms, procedures and/or processes for creating and/or implementing metadata and metadata structures is omitted here to avoid detracting from the invention.

Continuing with the specific illustrative example introduced above, recall that at OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 process for linking portions of digital media data during playback 200 was provided access to the digital audio data arranged in tracks that represented individual songs. Continuing with this specific example, at PROVIDE A USER THE ABILITY TO LINK TWO OR MORE OF THE TWO OR MORE TRACKS OF DIGITAL MEDIA DATA FOR PLAYBACK PURPOSES OPERATION 205, the user is provided the capability to link two of the digital audio data tracks, i.e., songs, using user interfaces such as user interfaces 300 and 400 of FIGS. 3 and 4, respectively.

In one embodiment, once a user is provided the capability to link two or more digital media data tracks/segments of digital media data at PROVIDE A USER THE ABILITY TO LINK TWO OR MORE OF THE TWO OR MORE TRACKS OF DIGITAL MEDIA DATA FOR PLAYBACK PURPOSES OPERATION 205, process flow proceeds to THE USER SELECTS TWO OR MORE TRACKS OF DIGITAL MEDIA DATA TO BE LINKED FOR PLAYBACK PURPOSES OPERATION 207.

In one embodiment, at THE USER SELECTS TWO OR MORE TRACKS OF DIGITAL MEDIA DATA TO BE LINKED FOR PLAYBACK PURPOSES OPERATION 207, the user utilizes the capability of PROVIDE A USER THE ABILITY TO LINK TWO OR MORE OF THE TWO OR MORE TRACKS OF DIGITAL MEDIA DATA FOR PLAYBACK PURPOSES OPERATION 205 to identify and link two or more digital media data tracks/segments of digital media data using a user interface, such as user interfaces 300 and 400 of FIGS. 3 and 4, respectively.

Returning to FIG. 2, as discussed above, there are many reasons why a user may wish to link two or more digital media data tracks/segments of digital media data at THE USER SELECTS TWO OR MORE TRACKS OF DIGITAL MEDIA DATA TO BE LINKED FOR PLAYBACK PURPOSES OPERATION 207. As also discussed above, one reason may be to preserve a specific order of playback of tracks, such as songs, in accordance with the original desires of the artist and/or the producer of the digital media data tracks, even when playing tracks back in random playback mode. In other cases, a user may wish to establish a playback order different from what the artist/producer intended. In yet another example, the user may wish to edit out, or skip, certain digital media data tracks/segments of digital media data. In other embodiments, the user may wish to link two or more digital media data tracks/segments of digital media data for any reason and/or to any end.

In one embodiment, once a user decides to link two or more digital media data tracks/segments of digital media data, for whatever reason, at THE USER SELECTS TWO OR MORE TRACKS OF DIGITAL MEDIA DATA TO BE LINKED FOR PLAYBACK PURPOSES OPERATION 207 the user makes his or her selection, in one embodiment, using a user interface, such as user interfaces 300 and 400 of FIG. 3 and FIG. 4.

Returning to FIG. 2, as noted above, in one embodiment, process for linking portions of digital media data during playback 200 is associated with a digital media management system, such as digital media management system 180 of FIG. 1, that implements, includes, is accessed by, and/or is otherwise associated with process for linking portions of digital media data during playback 200 (FIG. 2). Some of these digital media management systems provide the capability to obtain, receive, and/or process digital media data from one or more sources, often in multiple specific formats, then store the digital media data for presentation/playback in a data organizational scheme created using metadata. In some embodiments, at THE USER SELECTS TWO OR MORE TRACKS OF DIGITAL MEDIA DATA TO BE LINKED FOR PLAYBACK PURPOSES OPERATION 207, the user interface, such as user interfaces 300 and 400 of FIGS. 3 and 4, is presented to the user, and the user interface is used to link two or more digital media data tracks/segments of digital media data, through the digital media management system.

Returning to the specific example introduced above for illustrative purposes, and FIGS. 3 and 4, we stipulate that at THE USER SELECTS TWO OR MORE TRACKS OF DIGITAL MEDIA DATA TO BE LINKED FOR PLAYBACK PURPOSES OPERATION 207, the user decides that he or she wishes to maintain the playback order of two digital audio data tracks from his or her music collection. Referring to FIGS. 3 and 4, it can be seen, that, in this specific example, the user desires to preserve the artist intended playback order for the songs "Heart Breaker" and "Living Loving Maid (She's Just a Woman)" of Led Zeppelin's album "Led Zeppelin II". To this end, referring to FIG. 3, in this specific example, the user is shown the metadata for the digital media data track, i.e., song, "Heart Breaker" as indicated by digital media data identification section 303. In this specific example, the digital media data track, i.e., song, to be linked is indicated at Track to be Linked Field 311 as "Living Loving Maid (She's Just a Woman)".

As shown in FIG. 3, in this specific example, the user has checked Links checkbox 305 and thereby activated Type Field 307, Occurrence Field 309, and Track to be Linked Field 311. In this specific example, the user has selected a forward link in Type Field 307, thereby preserving the original playback order established by the artist of "Heart Breaker" immediately followed by "Living Loving Maid (She's Just a Woman)".

As also seen in FIG. 3, in this specific example, the user has indicated that the Link is to be applied to all playback occurrences via Occurrence Field 309. In addition, as discussed, the user has indicated in Track to be Linked Field 311 that the song "Living Loving Maid (She's Just a Woman)" is the linked digital media data track.

In one embodiment, the user's creation of the link for the song "Heart Breaker" using user interface 300 of FIG. 3 causes a corresponding link to be automatically created for the song "Living Loving Maid (She's Just a Woman)". This corresponding link is shown in FIG. 4.

As seen in FIG. 4, in response to the user's creation of the link for the song "Heart Breaker" using user interface 300 of FIG. 3, the metadata for the linked digital media data track, "Living Loving Maid (She's Just a Woman)", as indicated by digital media data identification section 403 of FIG. 4, is modified as follows. The digital media data track "Heart Breaker" is indicated at Track to be Linked Field 411 as being linked to "Living Loving Maid (She's Just a Woman)". In addition, Links checkbox 405 of FIG. 4 is activated, and the link so created is designated a backward link, as shown in Type Field 307, thereby again preserving the original playback order established by the artist of "Heart Breaker" immediately followed by "Living Loving Maid (She's Just a Woman)".

As also seen in FIG. 4, in this specific example, the link is to be applied to all playback occurrences as shown in Occurrence Field 409. In addition, in Track to be Linked Field 411 the song "Heart Breaker" is shown as the linked digital media data track.

Those of skill in the art will readily recognize that the choice of information displayed, the organization of the information displayed, and the manner in which the information is displayed in FIG. 3 and FIG. 4 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 and FIG. 4 are possible, and that the specific means discussed above do not limit the invention as set forth in the claims below.

In one embodiment, once the user utilizes the capability of PROVIDE A USER THE ABILITY TO LINK TWO OR MORE OF THE TWO OR MORE TRACKS OF DIGITAL MEDIA DATA FOR PLAYBACK PURPOSES OPERATION 205 to link two or more digital media data tracks/segments of digital media data using a user interface at THE USER SELECTS TWO OR MORE TRACKS OF DIGITAL MEDIA DATA TO BE LINKED FOR PLAYBACK PURPOSES OPERATION 207, process flow proceeds to STORE DATA REPRESENTING THE USER'S LINKING SELECTION OPERATION 209.

In one embodiment, at STORE DATA REPRESENTING THE USER'S LINKING SELECTION OPERATION 209 data representing the links created by the user at THE USER SELECTS TWO OR MORE TRACKS OF DIGITAL MEDIA DATA TO BE LINKED FOR PLAYBACK PURPOSES OPERATION 207 is stored in whole, or in part, in a database maintained by, accessible by, owned by, or otherwise related to: process for linking portions of digital media data during playback 200, and/or a provider of process for linking portions of digital media data during playback 200; a digital media management system, and/or a provider of a digital media management system; one or more digital media data providers; one or more digital media player providers; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memory 103A of FIG. 1, or in any main memory or mass memory, associated with a computing system and/or digital media player, such as computing systems 100 or digital media player 150 described above. In one embodiment, the data, in whole, or in part, is stored in any computing system and/or digital media player, such as computing systems 100 or digital media player 150, or server system, such as server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, by: process for linking portions of digital media data during playback 200, and/or a provider of process for linking portions of digital media data during playback 200; a digital media management system, and/or a provider of a digital media management system; one or more digital media data providers;

one or more digital media player providers; a third party data storage institution; any third party service or institution; or any other parties.

In some embodiments, the data representing the links created by the user at THE USER SELECTS TWO OR MORE TRACKS OF DIGITAL MEDIA DATA TO BE LINKED FOR PLAYBACK PURPOSES OPERATION 207 is stored in whole, or in part, by any of the means discussed above, and/or in a any of the locations discussed above, along with the underlying digital media data and/or metadata associated with the digital media data. In some embodiments, the data representing the links created by the user at THE USER SELECTS TWO OR MORE TRACKS OF DIGITAL MEDIA DATA TO BE LINKED FOR PLAYBACK PURPOSES OPERATION 207 is stored in whole, or in part, by any of the means discussed above, and/or in a any of the locations discussed above, separately from the underlying digital media data and/or metadata associated with the digital media data.

Continuing with the specific illustrative example introduced above, in this specific example, the data representing the linking of the songs "Heart Breaker" and "Living loving Maid (She's Just a Woman)" is stored in a memory of digital media player, such as memory 153 of digital media player 150 of FIG. 1, at a location separate from the underlying digital media data representing the songs. Then, when either of the songs is selected for playback, the data representing the linking of the songs is retrieved and associated with the respective song prior to the actual playback of the song.

In one embodiment, once data representing the links created by the user at THE USER SELECTS TWO OR MORE TRACKS OF DIGITAL MEDIA DATA TO BE LINKED FOR PLAYBACK PURPOSES OPERATION 207 is stored at STORE DATA REPRESENTING THE USER'S LINKING SELECTION OPERATION 209, process flow proceeds to PROCESS THE LINKED TWO OR MORE TRACKS OF DIGITAL MEDIA DATA AS A SINGLE ENTITY FOR PLAYBACK PURPOSES OPERATION 211.

In one embodiment at PROCESS THE LINKED TWO OR MORE TRACKS OF DIGITAL MEDIA DATA AS A SINGLE ENTITY FOR PLAYBACK PURPOSES OPERATION 211, the two or more digital media data tracks/segments of digital media data chosen to be linked at THE USER SELECTS TWO OR MORE TRACKS OF DIGITAL MEDIA DATA TO BE LINKED FOR PLAYBACK PURPOSES OPERATION 207 are, for playback purposes, treated as a single entity in accordance with the user's desires as indicated by the user's selections at THE USER SELECTS TWO OR MORE TRACKS OF DIGITAL MEDIA DATA TO BE LINKED FOR PLAYBACK PURPOSES OPERATION 207. Consequently, in one embodiment, when any one linked digital media data track/segment of digital data is selected for playback, in any mode, including random playback mode, all other linked digital media data tracks/segments of digital media data are also selected and played back in the indicated order.

Continuing with the specific example introduced above, once the songs "Heart Breaker" and "Living loving Maid (She's Just a Woman)" are linked by the user at THE USER SELECTS TWO OR MORE TRACKS OF DIGITAL MEDIA DATA TO BE LINKED FOR PLAYBACK PURPOSES OPERATION 207 in the manner discussed above, if either song is selected for playback, then, in this specific example, the other song is linked and is played relative to the selected song in accordance with the instructions of THE USER SELECTS TWO OR MORE TRACKS OF DIGITAL MEDIA DATA TO BE LINKED FOR PLAYBACK PURPOSES OPERATION 207. Specifically, if in a random playback mode, "Living loving Maid (She's Just a Woman)" is selected for playback, the fact that this digital media data track is linked to "Heart Breaker" is identified and then both tracks are prepared for playback. Then, in accordance with the selections made through interface screens 300 (FIG. 3) and 400 (FIG. 4) discussed above, "Heart Breaker" is played back before "Living loving Maid (She's Just a Woman)", and is then immediately followed by "Living loving Maid (She's Just a Woman)". This occurs despite the fact that "Living loving Maid (She's Just a Woman)" was the track actually selected and/or that random playback is the selected playback mode. As a result, in this specific example, the artist's intended playback order, and content, is preserved, even in random playback mode.

In one embodiment, once the two or more digital media data tracks/segments of digital media data chosen to be linked at THE USER SELECTS TWO OR MORE TRACKS OF DIGITAL MEDIA DATA TO BE LINKED FOR PLAYBACK PURPOSES OPERATION 207 are, for playback purposes, treated as a single entity in accordance with the user's desires as indicated by the user's selections of THE USER SELECTS TWO OR MORE TRACKS OF DIGITAL MEDIA DATA TO BE LINKED FOR PLAYBACK PURPOSES OPERATION 207 at PROCESS THE LINKED TWO OR MORE TRACKS OF DIGITAL MEDIA DATA AS A SINGLE ENTITY FOR PLAYBACK PURPOSES OPERATION 211, process flow proceeds to EXIT OPERATION 230. In one embodiment, at EXIT OPERATION 230, process for linking portions of digital media data during playback 200 is exited to await new data/user input.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for linking portions of digital media data during playback 200, a user is provided the capability to customize digital media data in an efficient and relatively simple way. As a result, a user of process for linking portions of digital media data during playback 200 is provided significant control over both the experience provided by the digital media data and the content of the digital media data. This capability can be used to not only increase the enjoyment of the digital media, and the digital media player, by providing the user capabilities previously available only to producers/providers of the digital media data, but also provides users with content control.

While the discussion above regarding process for linking portions of digital media data during playback 201 was largely directed to establishing a playback order for complete, and/or discrete, digital media data tracks/segments of digital media data, in one embodiment, two or more tracks/segments of digital data are linked using a metadata structure, and/or a metadata structure imposed upon existing metadata, to create "trans-segment portions of digital media data" thereby allowing the user to link not only two or more distinct digital media data tracks/segments of digital media data, but to link a specified portion of one digital media data track/segment of digital data to a specified portion of another digital media data track/segment of digital data.

Figure 5:
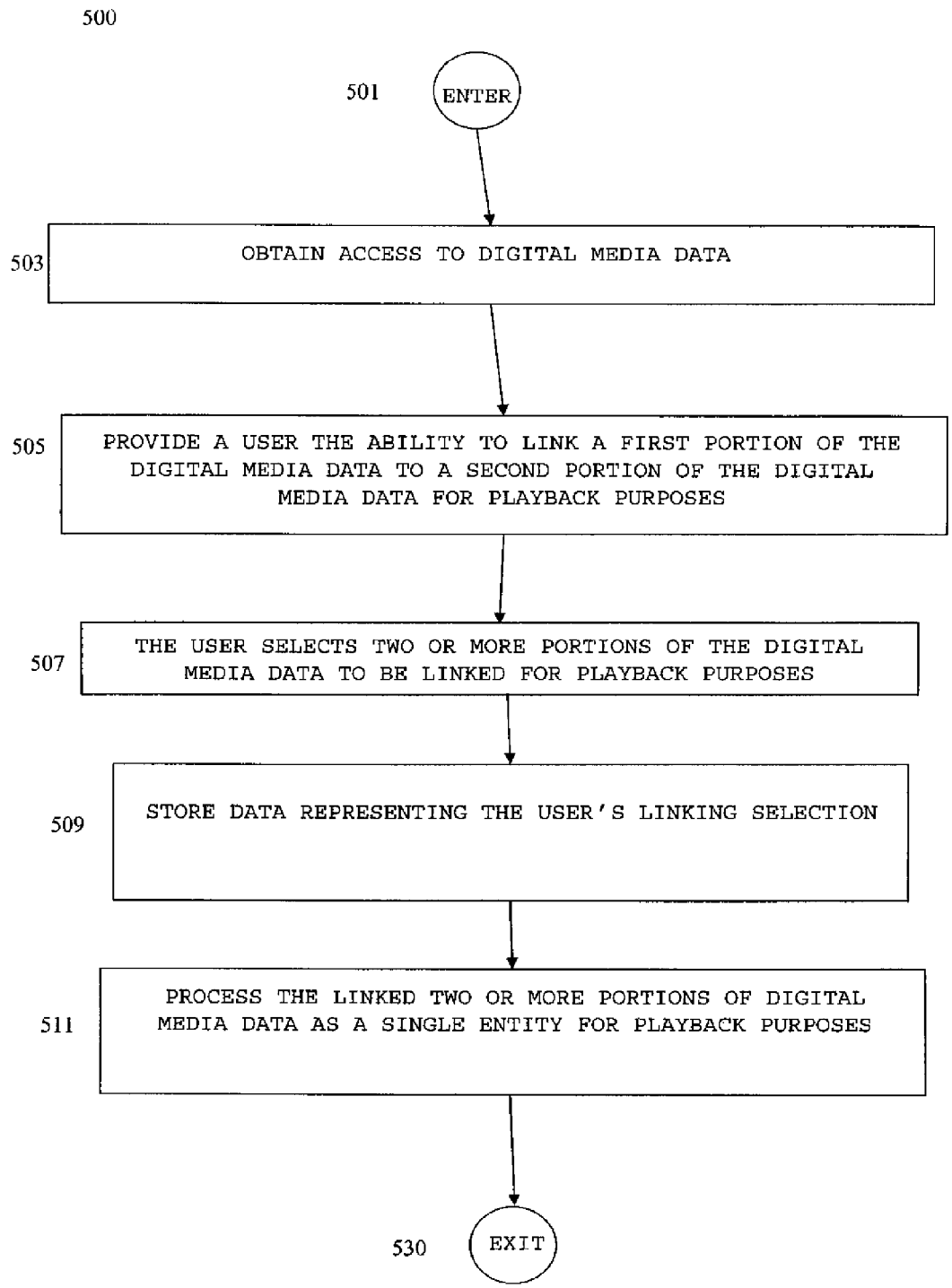
FIG. 5 is a flow chart depicting a process for linking digital media data during playback in accordance with one embodiment.

FIG. 5 a flow chart depicting a process for linking portions of digital media data during playback 500 in accordance with one embodiment. Process for linking portions of digital media data during playback 500 begins at ENTER OPERATION 501 of FIG. 5 and process flow proceeds to OBTAIN ACCESS TO DIGITAL MEDIA DATA OPERATION 503.

In one embodiment, at OBTAIN ACCESS TO DIGITAL MEDIA DATA OPERATION 503 process for linking portions of digital media data during playback 500 is provided access to one or more digital media data tracks/segments of digital media data.

In one embodiment, OBTAIN ACCESS TO DIGITAL MEDIA DATA OPERATION 503 of process for linking portions of digital media data during playback 500 is substantially similar to OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 of process for linking portions of digital media data during playback 200 of FIG. 2. Consequently, the discussion above with respect to OBTAIN ACCESS TO DIGITAL MEDIA DATA, THE DIGITAL MEDIA DATA ORGANIZED INTO TWO OR MORE TRACKS OF DIGITAL MEDIA DATA OPERATION 203 of process for linking portions of digital media data during playback 200 is applicable to, and incorporated here for, OBTAIN ACCESS TO DIGITAL MEDIA DATA OPERATION 503 of process for linking portions of digital media data during playback 500 (FIG. 5).

In one embodiment, once process for linking portions of digital media data during playback 500 is provided access to one or more tracks of digital media data at OBTAIN ACCESS TO DIGITAL MEDIA DATA OPERATION 503, process flow proceeds to PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505.

In one embodiment, at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505, a user is provided the capability to link two or more portions of one or more digital media data tracks/segments of digital media data into trans-segment portions of digital media data.

Recall that herein, the term "trans-segment portion of digital media data" denotes a segment of digital media data that can include all or part of two or more digital media tracks and/or segments of digital media data.

In one embodiment, at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505, a user is provided the capability to link a specified portion of one digital media data track/segment of digital data to a specified portion of either another digital media data track/segment of digital data, or of the same digital media data track/segment of digital data.

As discussed in more detail below, in one embodiment, at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505, a user is provided the capability to link two or more portions of one or more digital media data tracks/segments of digital media data into a trans-segment portion of digital media data such that the trans-segment portion of digital media data is treated as a single entity for playback purposes, thereby ensuring that the linked two or more portions of one or more digital media data tracks/segments of digital media data are played back in an order desired/dictated by the user, regardless of the playback mode selected, and with only the content desired by the user.

In one embodiment, at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505, a user is provided the capability to link two or more portions of one or more digital media data tracks/segments of digital media data into a trans-segment portion of digital media data via a user interface on a computing system based digital media player, such as display device 115 of computing system 100 in FIG. 1, and/or a display of a digital media player, such as display 165 of digital media player 150 in FIG. 1, that allows the user to link two or more portions of one or more digital media data tracks/segments of digital media data via any one or more well known user interface devices/actions such as "drag and drop", and/or editable lists of digital media data tracks/segments of digital media data, and/or user data entry fields.

Returning to FIG. 5, in one embodiment, at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505, in response to user interaction with a user interface, two or more portions of one or more digital media data tracks/segments of digital media data are linked using a metadata structure and/or a metadata structure imposed upon existing metadata into a trans-segment portion of digital media data. To this end, in one embodiment, at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505, an additional layer of metadata is made available to the user via the user interface on a computing system and/or a digital media player, such as computing system 100 of FIG. 1 and/or digital media player 150 of FIG. 1.

Returning to FIG. 5, in one embodiment, the additional layer of metadata provided at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505 allows the user to not only link two or more digital media data tracks/segments of digital media data into a trans-segment portion of digital media data, but to link an exact portion of one digital media data track/segment of digital data to an exact portion of a second, or the same, digital media data track/segment of digital data, in a single trans-segment portion of digital media data, thereby providing the user significant editing capability.

In addition, in one embodiment, the additional layer of metadata provided at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505 allows the user to link two or more portions of digital media data already structured via metadata into a trans-segment portion of digital media data using an additional metadata layer imposed over the existing metadata structure. For instance, in one embodiment, digital media data tracks/segments of digital media data already linked by metadata into in single "album" can be further linked to other digital media data tracks/segments of digital media data using a second layer of metadata. As an example, using one embodiment, portions of two albums can be linked for playback purposes. As another example, using one embodiment, portions of two or more video files and/or video works can be linked for playback purposes.

In one embodiment, the layer of metadata linking the associated digital media data tracks/segments of digital media data into a trans-segment portion of digital media data is stored on a digital media player, such as digital media player 150 of FIG. 1, and/or a computing system, such as computing system 100 of FIG. 1, linked to the digital media player. In one embodiment, the layer of metadata linking the associated digital media data tracks/segments of digital media data is stored separately from the associated digital media data. In one embodiment, the layer of metadata linking the associated digital media data tracks/segments of digital media data is transferred along with the associated digital media data whenever the associated digital media data transferred between computing systems and/or digital media players.

In one embodiment, once a user is provided the capability to link two or more portions of one or more digital media data tracks/segments of digital media data into a trans-segment portion of digital media data at PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505, process flow proceeds to THE USER SELECTS TWO OR MORE PORTIONS OF THE DIGITAL MEDIA DATA TO BE LINKED FOR PLAYBACK PURPOSES OPERATION 507.

In one embodiment, at THE USER SELECTS TWO OR MORE PORTIONS OF THE DIGITAL MEDIA DATA TO BE LINKED FOR PLAYBACK PURPOSES OPERATION 507, the user utilizes the capability of PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505 to link two or more portions of one or more digital media data tracks/segments of digital media data into a trans-segment portion of digital media data.

There are many reasons why a user may wish to link two or more portions of one or more digital media data tracks/segments of digital media data at THE USER SELECTS TWO OR MORE PORTIONS OF THE DIGITAL MEDIA DATA TO BE LINKED FOR PLAYBACK PURPOSES OPERATION 507. One reason may be to create a specific order of playback in accordance with the desires/needs of the artist and/or the producer of the digital media data, even when playing data back in random playback mode. In other cases, a user may wish to establish a custom playback order different from what the artist/producer intended. In yet another example, the user may wish to edit out, or skip, certain digital media data tracks/segments of digital media data.

More specifically, a user who is an artist and/or the producer of the digital media data may wish to create multiple versions of a given work and, in some cases include the multiple versions on a single release. For instance, an artist and/or the producer of the digital media data that is a movie may wish to include "G" rated versions and "R" rated versions on the same release. Using one embodiment of process for linking portions of digital media data during playback 500, the "G" rated version could be created by skipping over the "R" rated material using the user interface and the metadata structure discussed above. Likewise, this capability of one embodiment of process for linking portions of digital media data during playback 500, could be used to edit out, i.e., skip, content considered undesirable and/or inappropriate by the user, or considered inappropriate by the user for the intended viewer/listener. This capability is particularly useful for parents, guardians, or anyone else having control over what a child views/hears.

As another example, a user may wish to link two or more portions of one or more digital media data tracks/segments of digital media data at THE USER SELECTS TWO OR MORE PORTIONS OF THE DIGITAL MEDIA DATA TO BE LINKED FOR PLAYBACK PURPOSES OPERATION 507 to create abridged versions of audio books, or to skip "uninteresting" portions of audio and/or video data tracks. As noted, a user may wish to link two or more portions of one or more digital media data tracks/segments of digital media data at THE USER SELECTS TWO OR MORE PORTIONS OF THE DIGITAL MEDIA DATA TO BE LINKED FOR PLAYBACK PURPOSES OPERATION 507 to create highly customized, and unique, playback experiences.

In short, a user may wish to link two or more portions of one or more digital media data tracks/segments of digital media data at THE USER SELECTS TWO OR MORE PORTIONS OF THE DIGITAL MEDIA DATA TO BE LINKED FOR PLAYBACK PURPOSES OPERATION 507 to give the user producer/editor capabilities, or the user may actually be a producer/editor that desires to provide multiple track versions on and/or for a portable multimedia player. These are but a few reasons a user might wish to link two or more portions of one or more digital media data tracks/segments of digital media data into a trans-segment portion of digital media data at THE USER SELECTS TWO OR MORE PORTIONS OF THE DIGITAL MEDIA DATA TO BE LINKED FOR PLAYBACK PURPOSES OPERATION 507, many others are possible and it is anticipated that, once this capability is widely offered, numerous other uses of this capability will surface.

In one embodiment, once a user decides to link two or more portions of one or more digital media data tracks/segments of digital media data into a trans-segment portion of digital media data, for whatever reason, at THE USER SELECTS TWO OR MORE PORTIONS OF THE DIGITAL MEDIA DATA TO BE LINKED FOR PLAYBACK PURPOSES OPERATION 507 the user makes his or her selection, in one embodiment, using a user interface.

FIG. 6 is a representation of one example of a user interface 600 for creating a "Forward/Skip To" link between two digital media data portions in accordance with one embodiment. In the specific example shown in FIG. 6, the digital media data is shown as video data. However, the reader is again reminded that that the digital media data can be any form of digital media data, as discussed herein, known in the art, or as developed after the time of filing.

As seen in FIG. 6, user interface 600 includes digital media data identification section 603. Typically, the information shown in digital media data identification section 603 is metadata provided by any one of: the digital media player, such as digital media player 105 or computing system 100 of FIG. 1; a digital media management system, such as digital media management system 180 of FIG. 1; the provider of the digital media data and/or the digital media player; a database, such as a DVD database; or any other source of digital media data identification discussed herein, known at the time of filing, or as developed thereafter.

Returning to FIG. 6, user interface 600 also includes "Links" checkbox 605. In one embodiment, the user is provided the opportunity to check/activate Links checkbox 605 using a user interface device. In one embodiment, by checking/activating Links checkbox 605, the user activates the linking/editing feature of process for linking portions of digital media data during playback 500 (FIG. 5).

Returning to FIG. 6, in one embodiment, once a user checks/activates Links checkbox 605, Type Field 607, Skip From Field 609, and Skip To Field 611 become active. In one embodiment, Type Field 607 allows a user to designate a desired link as a Forward/Skip To link or another type of link, such as a Skip To End Link, or a Skip To Track link.

User interface 600 also includes Skip From Field 609 and Skip To Field 611. In this specific example, Skip From field 609 and Skip To Field 611 are used in conjunction to effectively edit out all digital media data content from running time 1:12 to 1:37. In one embodiment, this could represent the editing out of objectionable content of the digital media data track entitled R-Rated Movie.

Those of skill in the art will readily recognize that the choice of information displayed, the organization of the information displayed, and the manner in which the information is displayed in FIG. 6 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 6 are possible, and that the specific means discussed above do not limit the invention as set forth in the claims below.

Returning to FIG. 5, as noted above, in one embodiment, process for linking portions of digital media data during playback 500 is associated with a digital media management system, such as digital media management system 180 of FIG. 1, that implements, includes, is accessed by, and/or is otherwise associated with process for linking portions of digital media data during playback 500 (FIG. 5). Some of these digital media management systems provide the capability to obtain, receive, and/or process digital media data from one or more sources, often in multiple specific formats, store the digital media data, and then present the digital media data to the user in a data organizational scheme using metadata. In some embodiments, at THE USER SELECTS TWO OR MORE PORTIONS OF THE DIGITAL MEDIA DATA TO BE LINKED FOR PLAYBACK PURPOSES OPERATION 507, the user interface, such as user interface 600 of FIG. 6, is presented to the user, and the user interface is used to link two or more portions of one or more digital media data tracks/segments of digital media data, through the digital media management system.

In one embodiment, once the user utilizes the capability of PROVIDE A USER THE ABILITY TO LINK A FIRST PORTION OF THE DIGITAL MEDIA DATA TO A SECOND PORTION OF THE DIGITAL MEDIA DATA FOR PLAYBACK PURPOSES OPERATION 505 to link two or more portions of one or more digital media data tracks/segments of digital media data into a trans-segment portion of digital media data using a user interface at THE USER SELECTS TWO OR MORE PORTIONS OF THE DIGITAL MEDIA DATA TO BE LINKED FOR PLAYBACK PURPOSES OPERATION 507, process flow proceeds to STORE DATA REPRESENTING THE USER'S LINKING SELECTION OPERATION 509.

In one embodiment, STORE DATA REPRESENTING THE USER'S LINKING SELECTION OPERATION 509 is substantially similar to STORE DATA REPRESENTING THE USER'S LINKING SELECTION OPERATION 209 of process for linking portions of digital media data during playback 200 of FIG. 2. Consequently, the discussion above with respect to STORE DATA REPRESENTING THE USER'S LINKING SELECTION OPERATION 209 of process for linking portions of digital media data during playback 200 is applicable to, and incorporated here for, OBTAIN STORE DATA REPRESENTING THE USER'S LINKING SELECTION OPERATION 509 of process for linking portions of digital media data during playback 500.

In one embodiment, once data representing the links created by the user at THE USER SELECTS TWO OR MORE PORTIONS OF THE DIGITAL MEDIA DATA TO BE LINKED FOR PLAYBACK PURPOSES OPERATION 507 is stored at STORE DATA REPRESENTING THE USER'S LINKING SELECTION OPERATION 509, process flow proceeds to PROCESS THE LINKED TWO OR MORE PORTIONS OF DIGITAL MEDIA DATA AS A SINGLE ENTITY FOR PLAYBACK PURPOSES OPERATION 511.

In one embodiment at PROCESS THE LINKED TWO OR MORE PORTIONS OF DIGITAL MEDIA DATA AS A SINGLE ENTITY FOR PLAYBACK PURPOSES OPERATION 511, the two or more digital media data tracks/segments of digital media data chosen to be linked into a trans-segment portion of digital media data at THE USER SELECTS TWO OR MORE PORTIONS OF THE DIGITAL MEDIA DATA TO BE LINKED FOR PLAYBACK PURPOSES OPERATION 507 are, for playback purposes, treated as a single entity in accordance with the user's desires as indicated by the user's selections at THE USER SELECTS TWO OR MORE PORTIONS OF THE DIGITAL MEDIA DATA TO BE LINKED FOR PLAYBACK PURPOSES OPERATION 507. Consequently, in one embodiment, when any one linked digital media data track/segment of digital data of a trans-segment portion of digital media data is selected for playback, in any mode, including random playback mode, all other linked digital media data tracks/segments of digital media data of the trans-segment portion of digital media data are also selected and played back, in the indicated order.

In one embodiment once the two or more digital media data tracks/segments of digital media data chosen to be linked into a trans-segment portion of digital media data at THE USER SELECTS TWO OR MORE PORTIONS OF THE DIGITAL MEDIA DATA TO BE LINKED FOR PLAYBACK PURPOSES OPERATION 507 are, for playback purposes, treated as a single entity in accordance with the user's desires as indicated by the user's selections at THE USER SELECTS TWO OR MORE PORTIONS OF THE DIGITAL MEDIA DATA TO BE LINKED FOR PLAYBACK PURPOSES OPERATION 507 at PROCESS THE LINKED TWO OR MORE PORTIONS OF DIGITAL MEDIA DATA AS A SINGLE ENTITY FOR PLAYBACK PURPOSES OPERATION 511, process flow proceeds to EXIT OPERATION 530. In one embodiment, at EXIT OPERATION 530, process for linking portions of digital media data during playback 500 is exited to await new data/user input.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for linking portions of digital media data during playback 500, a user is provided the capability to customize digital media data in an efficient and relatively simple way. As a result, a user of process for linking portions of digital media data during playback 500 is provided significant control over both the experience provided by the digital media data and the content of the digital media data. This capability can be used to not only increase the enjoyment of the digital media, and the digital media player, by providing the user capabilities previously available only to producers/providers of the digital media data, but also provides users with content control.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing", "obtaining", "selecting", "identifying", "transferring", "storing", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for linking portions of digital media data during playback comprising:
   obtaining access to digital media data, the digital media data being in a digital media encoding format, the digital media data including at least three digital media data segments, the three or more digital media segments being designated as a totality of digital media segments, with no more than two of the three or more digital media segments of the totality being from a same digital media track, wherein each track includes a plurality of digital media segments; and
   responsive to user input, linking two or more of the at least two digital media data segments, the two or more linked digital media data segments including fewer than the totality of digital media data segments, at least two of the two or more linked segments being from different digital media tracks, the two or more linked digital media data segments being linked into a trans-segment portion of digital media data such that the linked two or more digital media data segments are processed as a single entity for playback purposes, regardless of a playback mode selected.

2. The computing system implemented process for linking portions of digital media data during playback of claim 1, wherein;
   responsive to user input, linking two or more of the at least two digital media data segments, the two or more linked digital media data segments including fewer than the totality of digital media data segments, at least two of the two or more linked segments being from different digital media tracks, the two or more linked digital media data segments being linked into a trans-segment portion of digital media data comprises providing the user with a user interface, the user interacting with the user interface via a user interface device to link two or more of the at least three digital media data segments.

3. The computing system implemented process for linking portions of digital media data during playback of claim 2, wherein;
   through the user interface, the user designates the playback order of the linked two or more digital media data segments with respect to each other such that:
   a first digital media data segment of the trans-segment portion of digital media data is played back before a second digital media data segment of the trans-segment portion of digital media data; and
   the second digital media data segment of the trans-segment portion of digital media data is played back immediately following the first digital media data segment of the trans-segment portion of digital media data.

4. The computing system implemented process for linking portions of digital media data during playback of claim 3, wherein;
   in response to the user's designation of the playback order of the linked first and second digital media data segments with respect to each other;
   a layer of metadata is used to link the first digital media data segment to the second digital media data segment in the trans-segment portion of digital media data such that the first digital media data segment is played back before the second digital media data segment and the second digital media data segment is played back immediately following the first digital media data segment.

5. The computing system implemented process for linking portions of digital media data during playback of claim 4, wherein;
   the digital media player includes an associated digital media management system.

6. A system for providing a process for linking portions of digital media data during playback comprising:
   a digital media player;
   means for obtaining access to digital media data, the digital media data being in a digital media encoding format, the digital media data comprising at least three digital media data segments, each digital media data segment including a portion of the digital media data, the three or more digital media segments being designated as a totality of digital media segments, with no more than two of the three or more digital media segments of the totality being from a same digital media track, wherein each track includes a plurality of digital media segments; and
   means for linking, responsive to user input, two or more of the at least two digital media data segments, the two or more linked digital media data segments including fewer than the totality of digital media data segments, at least two of the two or more linked segments being from different digital media tracks, the two or more linked digital media data segments being linked such that the linked two or more digital media data segments are processed as a single entity for playback purposes using the digital media player regardless of a playback mode selected.

7. The system for providing a process for linking portions of digital media data during playback of claim 6, wherein;
   the digital media data is digital audio data.

8. The system for providing a process for linking portions of digital media data during playback of claim 6, wherein;
   the digital media encoding format is a digital media encoding format chosen from the list of digital media encoding formats consisting of:
   Audio Level 3 (MP-3);
   Windows Media Audio (WMA);
   Advanced Audio Coding (AAC); and
   Waveform Audio Format (WAV).

9. The system for providing a process for linking portions of digital media data during playback of claim 6, wherein;
   the digital media data is digital video data.

10. The system for providing a process for linking portions of digital media data during playback of claim 9, wherein;
    the digital media encoding format is a digital media encoding format chosen from the list of digital media encoding formats consisting of:
    MPEG-4;
    WMV;
    AVI;
    Xvid.

11. The system for providing a process for linking portions of digital media data during playback of claim 6, wherein;
    the means for providing a user the ability to link two or more of the at least two digital media data segments comprises means for providing the user with a user interface, the user interacting with the user interface via a user interface device to link the two or more of the at least two digital media data segments.

12. The system for providing a process for linking portions of digital media data during playback of claim 11, wherein;
through the user interface, the user designates the playback order of the linked two or more digital media data segments with respect to each other such that:
a first digital media data segment of the two or more digital media data segments is played back before a second digital media data segment of the two or more digital media data segments; and
the second digital media data segment of the two or more digital media data segments is played back immediately following the first digital media data segment of the two or more digital media data segments.

13. The system for providing a process for linking portions of digital media data during playback of claim 12, wherein;
in response to the user's designation of the playback order of the linked first and second digital media data segments with respect to each other;
a forward pointer is associated with the first digital media data segment, the forward pointer linking the first digital media data segment to the second digital media data segment; and
a backward pointer is associated with the second digital media data segment, the backward pointer linking the second digital media data segment to the first digital media data segment.

14. The system for providing a process for linking portions of digital media data during playback of claim 12, wherein;
in response to the user's designation of the playback order of the linked first and second digital media data segments with respect to each other;
a layer of metadata is used to link the first digital media data segment to the second digital media data segment such that the first digital media data segment is played back before the second digital media data segment and the second digital media data segment is played back immediately following the first digital media data segment.

15. A system for providing a process for linking portions of digital media data during playback comprising:
one or more computing processors; and
one or more memories coupled to the one or more processors, the one or more memories having stored therein processor executable code which when executed by the one or more processors perform a process comprising:
obtaining access to digital media data, the digital media data being in a digital media encoding format, the digital media data including at least three digital media data segments, the at least three digital media segments being designated as a totality of digital media segments, with no more than two of the three or more digital media segments of the totality being from a same digital media track, wherein each track includes a plurality of digital media segments; and
responsive to user input linking two or more of the at least two digital media data segments, the two or more linked digital media data segments including fewer than the totality of digital media data segments, the two or more linked digital media data segments being linked such that the linked two or more digital media data segments are processed as a single entity for playback purposes using the digital media player regardless of a playback mode selected.

16. The system for providing a process for linking portions of digital media data during playback of claim 15, wherein;
at least one of the at least two digital media data segments comprises a sub-set of a digital media data track.

17. The system for providing a process for linking portions of digital media data during playback of claim 15, wherein;
at least one of the at least two digital media data segments comprises at least one digital media data track.

18. The system for providing a process for linking portions of digital media data during playback of claim 15, wherein;
at least one of the at least two digital media data segments comprises at least two digital media data tracks.

19. A method for linking portions of digital media data during playback comprising:
obtaining access to digital media data, the digital media data being in a digital media encoding format, the digital media data comprising at least three digital media data segments, each digital media data segment including a portion of the digital media data, the at least three digital media segments being designated as a totality of digital media segments, with no more than two of the three or more digital media segments of the totality being from a same digital media track, wherein each track includes a plurality of digital media segments; and
providing a user the ability to link two or more of the at least two digital media data segments, the two or more linked digital media data segments including fewer than the totality of digital media data segments, the two or more linked digital media data segments being linked such that the linked two or more digital media data segments are processed as a single entity for playback purposes regardless of a playback mode selected.

20. The method for linking portions of digital media data during playback of claim 19, wherein;
the digital media data is digital audio data.

21. The method for linking portions of digital media data during playback of claim 20, wherein;
the digital media encoding format is a digital media encoding format chosen from the list of digital media encoding formats consisting of:
Audio Level 3 (MP-3);
Windows Media Audio (WMA);
Advanced Audio Coding (AAC); and
Waveform Audio Format (WAV).

22. The method for linking portions of digital media data during playback of claim 19, wherein;
the digital media data is digital video data.

23. The method for linking portions of digital media data during playback of claim 22, wherein;
the digital media encoding format is a digital media encoding format chosen from the list of digital media encoding formats consisting of:
MPEG-4;
WMV;
AVI;
Divx; and
Xvid.

24. The method for linking portions of digital media data during playback of claim 19, wherein;
providing a user the ability to link two or more of the at least two digital media data segments comprises providing the user with a user interface, the user interacting with the user interface via a user interface device to link the two or more of the at least two digital media data segments.

25. The method for linking portions of digital media data during playback of claim 24, wherein;

through the user interface, the user designates the playback order of the linked two or more digital media data segments with respect to each other such that:

a first digital media data segment of the two or more digital media data segments is played back before a second digital media data segment of the two or more digital media data segments; and the second digital media data segment of the two or more digital media data segments is played back immediately following the first digital media data segment of the two or more digital media data segments.

26. The method for linking portions of digital media data during playback of claim 25, wherein;

in response to the user's designation of the playback order of the linked first and second digital media data segments with respect to each other;

a forward pointer is associated with the first digital media data segment, the forward pointer linking the first digital media data segment to the second digital media data segment; and a backward pointer is associated with the second digital media data segment, the backward pointer linking the second digital media data segment to the first digital media data segment.

27. The method for linking portions of digital media data during playback of claim 25, wherein;

in response to the user's designation of the playback order of the linked first and second digital media data segments with respect to each other;

a layer of metadata is used to link the first digital media data segment to the second digital media data segment such that the first digital media data segment is played back before the second digital media data segment and the second digital media data segment is played back immediately following the first digital media data segment.

* * * * *

UNITED STATES PATENT AND TRADEMARK OFFICE
CERTIFICATE OF CORRECTION

PATENT NO. : 8,180,469 B1
APPLICATION NO. : 12/051131
DATED : May 15, 2012
INVENTOR(S) : Todd M. Fitch et al.

Page 1 of 1

It is certified that error appears in the above-identified patent and that said Letters Patent is hereby corrected as shown below:

In the Claims

In Column 32, between Lines 59 and 60, Claim 10, insert --Divx; and--.

Signed and Sealed this
Tenth Day of June, 2014

Michelle K. Lee
*Deputy Director of the United States Patent and Trademark Office*